(12) United States Patent
Senegas et al.

(10) Patent No.: US 9,038,944 B2
(45) Date of Patent: May 26, 2015

(54) ELECTROMECHANICAL ACTUATOR FOR AN AIRCRAFT CONTROL SURFACE, AND AN AIRCRAFT PROVIDED WITH SUCH AN ACTUATOR

(71) Applicant: SAGEM DEFENSE SECURITE, Boulogne Billancourt (FR)

(72) Inventors: David Senegas, Boulogne Billancourt (FR); Jerome Mehez, Boulogne Billancourt (FR); Maxime Jestin, Boulogne Billancourt (FR); Bertrand Sevagen, Boulogne Billancourt (FR)

(73) Assignee: SAGEM DEFENSE SECURITE, Boulogne Billancourt (FR)

( * ) Notice: Subject to any disclaimer, the term of this patent is extended or adjusted under 35 U.S.C. 154(b) by 0 days.

(21) Appl. No.: 14/358,651

(22) PCT Filed: Nov. 21, 2012

(86) PCT No.: PCT/EP2012/073264
§ 371 (c)(1),
(2) Date: May 15, 2014

(87) PCT Pub. No.: WO2013/076158
PCT Pub. Date: May 30, 2013

(65) Prior Publication Data
US 2014/0326828 A1 Nov. 6, 2014

Related U.S. Application Data

(60) Provisional application No. 61/562,736, filed on Nov. 22, 2011.

(30) Foreign Application Priority Data

Apr. 2, 2012 (FR) ...................................... 12 53023

(51) Int. Cl.
B64C 3/38 (2006.01)
B64C 13/30 (2006.01)
B64C 13/28 (2006.01)
B64C 13/24 (2006.01)
F16H 21/22 (2006.01)
F16H 35/00 (2006.01)

(52) U.S. Cl.
CPC ........... *B64C 13/30* (2013.01); *F16H 2035/005* (2013.01); *B64C 13/28* (2013.01); *B64C 13/24* (2013.01); *F16H 35/00* (2013.01); *F16H 21/22* (2013.01)

(58) Field of Classification Search
USPC ...................... 244/99.2, 99.3, 99.4, 231, 232; 74/89.38, 89.14, 89.39, 89.28, 473.12, 74/42
See application file for complete search history.

(56) References Cited

U.S. PATENT DOCUMENTS

| 4,181,275 | A | * | 1/1980 | Moelter et al. | ................. 244/213 |
| 4,637,272 | A | * | 1/1987 | Teske et al. | .................. 74/89.26 |
| 4,762,205 | A | | 8/1988 | Ortman | |
| 7,100,870 | B2 | * | 9/2006 | Flatt | ............................ 244/99.2 |

(Continued)

FOREIGN PATENT DOCUMENTS

| DE | 44 13 854 A1 | 10/1995 |
| EP | 0 960 811 A2 | 12/1999 |
| WO | WO 98/42567 A1 | 10/1998 |

*Primary Examiner* — Christopher P Ellis
(74) *Attorney, Agent, or Firm* — Muncy, Geissler, Olds & Lowe, P.C.

(57) ABSTRACT

An electromechanical actuator for a movable flight control surface of an aircraft, the actuator comprising an electric motor having an outlet shaft with first and second directions of rotation, a movement transmission arranged to connect the outlet shaft of the motor to the movable flight control surface, and a control unit for controlling the motor. The transmission incorporates a pawl device arranged to oppose the transmission of movement in the first direction of rotation, and the control unit is connected to a pawl declutching member for declutching the pawl and enabling movement to be transmitted in the first direction of rotation.

7 Claims, 6 Drawing Sheets

(56) References Cited

U.S. PATENT DOCUMENTS

| | | | |
|---|---|---|---|
| 7,347,115 B2 * | 3/2008 | Otaki et al. | 74/89.38 |
| 8,136,418 B2 * | 3/2012 | Behar et al. | 74/89.23 |
| 8,230,750 B2 * | 7/2012 | Flatt et al. | 74/89.38 |
| 8,794,084 B2 * | 8/2014 | Nguyen et al. | 74/89.26 |

\* cited by examiner

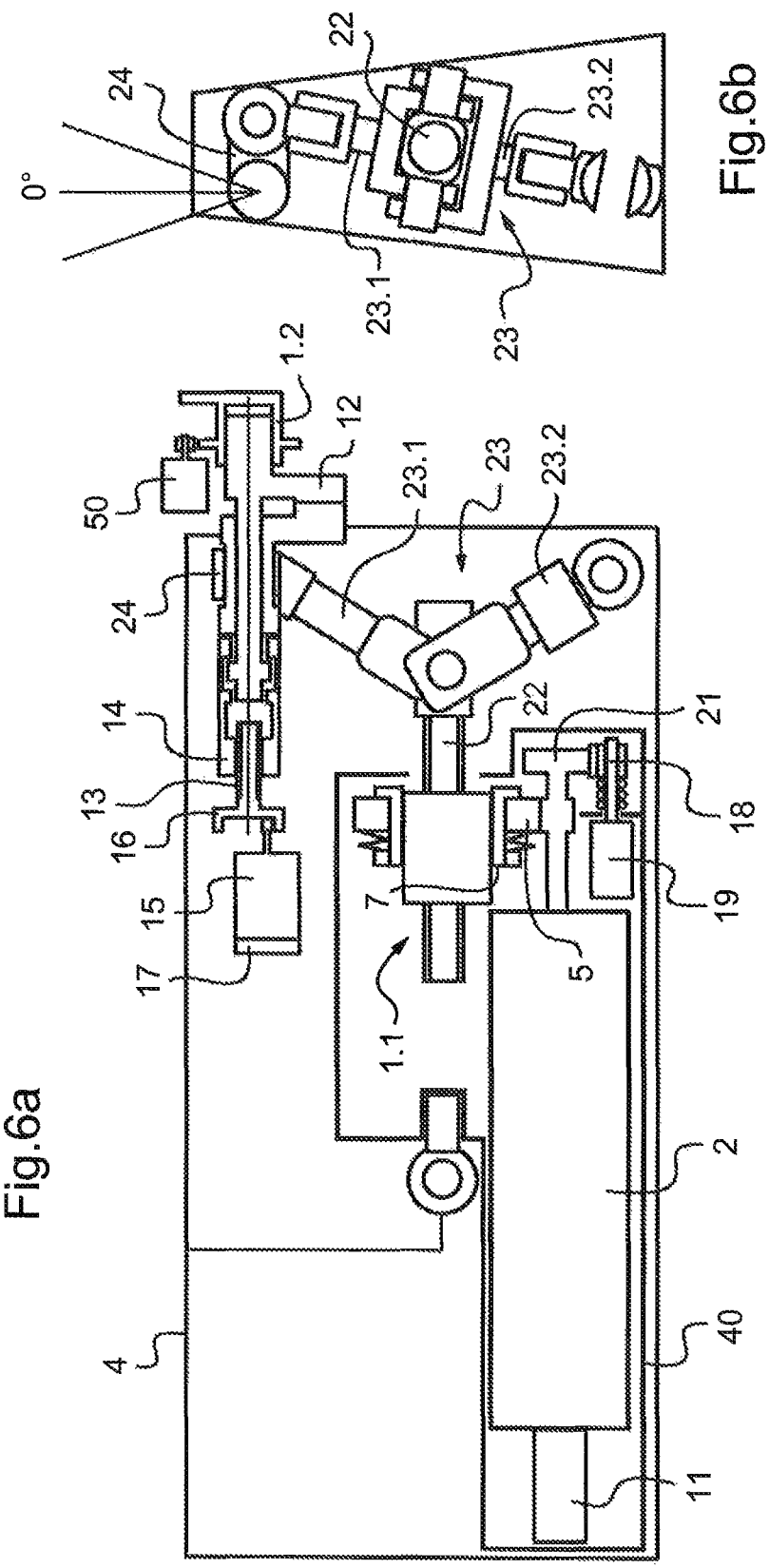

ELECTROMECHANICAL ACTUATOR FOR AN AIRCRAFT CONTROL SURFACE, AND AN AIRCRAFT PROVIDED WITH SUCH AN ACTUATOR

The present invention relates to an electromechanical actuator of a movable flight control surface of an aircraft such as an airplane. By way of example, such a flight control surface is an aileron, an elevon, or a spoiler.

In general, an electromechanical actuator of a movable flight control surface of an aircraft comprises an electric motor having an outlet shaft with first and second directions of rotation, and a movement transmission arranged to connect the outlet shaft of the motor to the movable flight, control surface. The motor is controlled by a control unit that receives commands from the flight control unit of the aircraft.

The loss of power to such actuators can lead to consequences that are catastrophic by allowing the aileron/elevon/spoiler to move in a way that risks unbalancing the aircraft, increasing its drag, or damaging its structure by the resulting vibration (a phenomenon known as "flutter").

An object of the invention is to provide means for remedying the above-mentioned drawback.

To this end, the invention provides an electromechanical actuator for a movable flight control surface of an aircraft, the actuator comprising an electric motor having an outlet shaft with first and second directions of rotation, a movement transmission arranged to connect the outlet shaft of the motor to the movable flight control surface, and a control unit for controlling the motor. The transmission incorporates a pawl device arranged to oppose the transmission or movement in the first direction of rotation, and the control unit is connected to a pawl declutching member for declutching the pawl and enabling movement to be transmitted in the first direction of rotation.

Thus, there is no need to power the motor in order to oppose movement in the first direction of rotation.

The invention also provides an aircraft having wings, each provided with at least one movable airfoil surface of the aileron/elevon/spoiler type associated with at least one such actuator, the actuator being mounted so that the pawl opposes a deflection movement of the airfoil surface.

Other characteristics and advantages invention appear on reading the following description of particular, nonlimiting embodiments of the invention.

Reference is made to the accompanying drawings, in which:

FIG. 6a and FIG. 6b are respectively a longitudinal section view and a cross section view of the FIG. 5 actuator.

Figure 1:
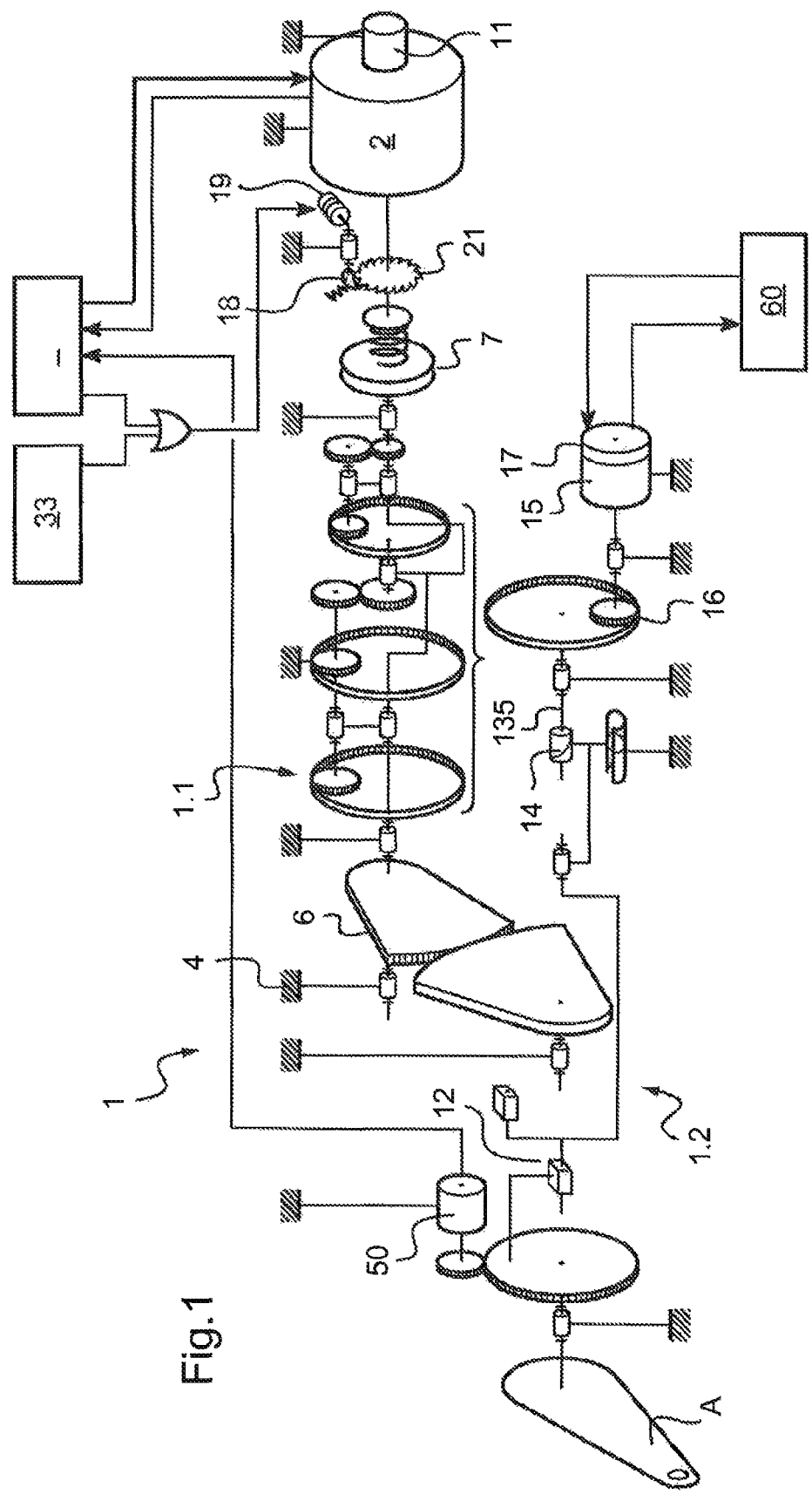
FIG. 1 is a kinematic diagram of an actuator in a first embodiment.

With reference to the figures, the invention is described herein in its application to actuating an aileron/elevon/spoiler that is movably mounted at the rear edge of an aircraft wing. The aileron/elevon/spoiler is secured to a crank or interface referenced A in the figures.

The actuator of the invention is of the electromechanical type.

In outline, the crank A of the aileron/elevon/spoiler is actuated via a transmission given overall reference 1 by an electric motor 2 that is controlled by two electronic control units 3 receiving signals from an angle position sensor 50. The presence of two identical control units 3 provides redundancy, enabling one of the control units to take the place of the other in the event of the other unit failing.

In this example, the transmission 1 is split in two lines in order to limit its overall length so that it comprises a first line of shafts 1.1 and a second line of shafts 1.2.

Figure 2:
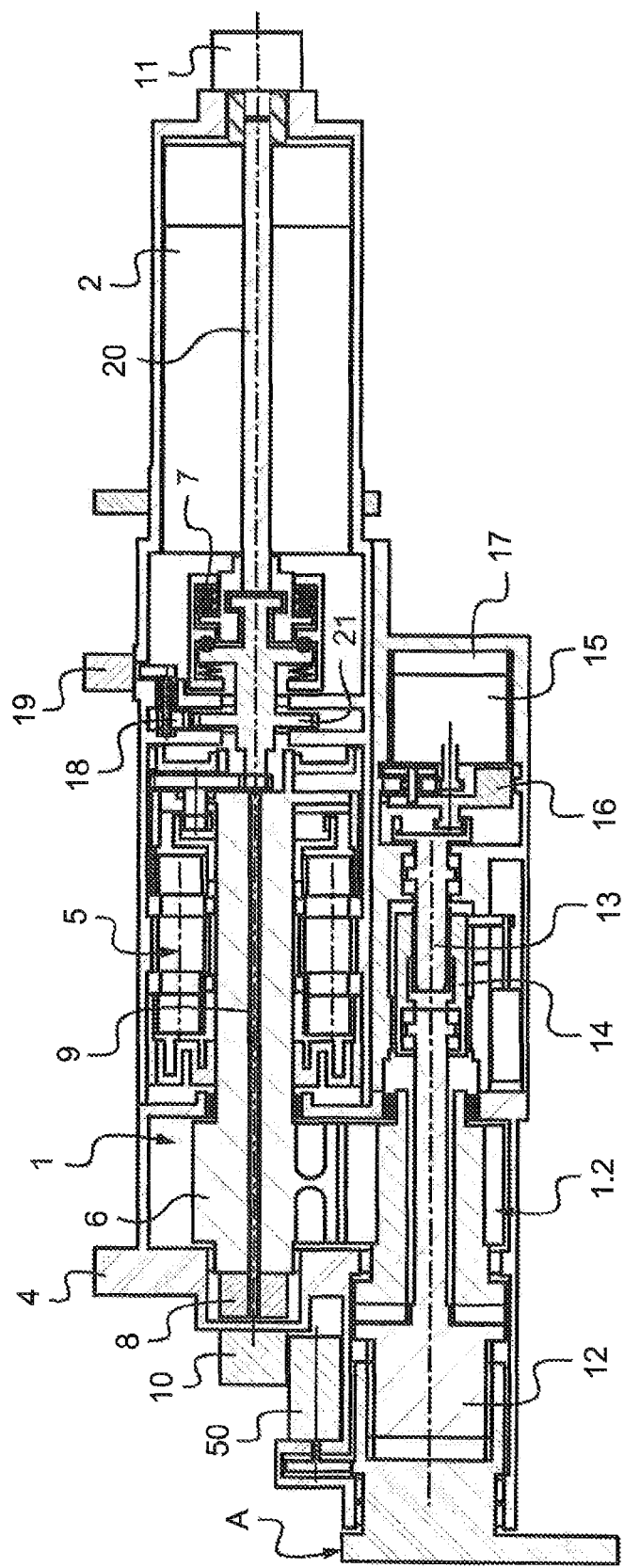
FIG. 2 is a longitudinal section view of the FIG. 1 actuator.

The first embodiment of the invention is described below with reference to FIGS. 1 and 2.

The actuator comprises a casing 4 forming a stationary structure, which casing is arranged to be fastened in the wing of the aircraft, e.g. by bolts, and receives the motor 2 and the movement transmission 1.

The motor 2 is of the brushless type and has an outlet shaft 20 connected to the transmission 1. The motor 2 is arranged, when appropriately powered, to set its outlet shaft 20 into rotation in either of two opposite directions of rotation that are referred to herein respectively as the first and second directions of rotation.

In known manner, the transmission 1 comprises a succession of gear trains enabling a predetermined reduction ratio to be obtained for moving the aileron/elevon/spoiler under the conditions imposed for its operation. In this example, the gear trains comprise a group 5 of epicyclic gear trains in series referred to as the "nested train", and a train of parallel gears 6. The train of parallel gears 6 transmits the movement of the first line of shafts 1.1 to the second line of shafts 1.2. The stationary outside rings of the epicyclic trains with inwardly-directed sets of teeth are secured directly to the inside wall of the casing 4 so as to limit the overall size of the actuator and so as to simplify its structure. The torque and the speed of the transmitted movement depend on the ratios of the numbers of teeth between the various gears. These gear trains are not described in detail herein.

A torque limiter 7 is located upstream from the group 5. The torque limiter 7 is of the friction type and comprises two plates that are urged resiliently one against the other, namely an inlet plate constrained to rotate with the outlet shaft 20 of the motor 2, and an outlet plate constrained to rotate with the inlet gear of the group 5. The torque limiter 7 provides passive torque limiting. A load sensor 8 is also provided that is connected to the control unit 3 controlling the motor 2 to ensure that the load exerted on the transmission 1 does not exceed a predetermined threshold. The load sensor 8 generates a measurement signal representative of the twisting of the shaft of the transmission 1 relative to a pointer 9. The measurement signal is transmitted, to a receiver 10 via a transformer to avoid using any loose wiring or slip rings.

The transmission 1 also includes a damper 11 that acts in the event of the electronic control unit 3 not being electrically powered. In this example, the damper 11 is located behind the motor 2 on the casing 4, and the outlet shaft 20 has an end that projects from the casing 4 and that is constrained to rotate with the damper 11.

The actuator includes a clutch 12 that is located in the vicinity of the outlet from the transmission on the second line of shafts 1.2, and that has an outlet that is connected to the crank A. The clutch 12 is actuated via a linear actuator device comprising a screw-and-nut system 13, 14 connected to a rotary electric motor 15 via a set of gears 16. The position of the nut 14 of the actuator device for the clutch 12 is determined by a sensor 17. The rotary electric motor 15 is connected to the flight control center (FCC) 60 of the aircraft in order to allow the crank A to move freely in the event of any of the elements of the actuator jamming.

The transmission 1 incorporates a pawl device 18 arranged to oppose the transmission of movement in the first direction of rotation, and the control unit 3 is connected to a pawl declutching member 19 for declutching the pawl 18 so as to allow movement to be transmitted in the first direction of rotation. The pawl 18 has one end mounted to pivot in the casing 4 and a free end that is urged resiliently to bear against the teeth of a ratchet wheel 21 constrained to rotate with the outlet shaft 20 of the motor 2. The pawl declutching member 19 comprises an electromagnet that, when powered, holds the free end of the pawl 18 apart from the teeth of the ratchet wheel 21. Thus, when the electromagnet is not powered (the declutching member is then deactivated), in particular when the control unit 3 is not electrically powered for all of the control units are powered if the aileron/eleven/spoiler in question is associated with a plurality of control units) the free end of the pawl 18 is returned resiliently against the teeth and prevents movement being transmitted in the first direction of rotation.

The motor 2, the pawl device 18, the torque limiter 7, the damper 11, and the gear trains 5, 6, are mounted on the first line of shafts 1.1.

The clutch 12 is mounted on the second line of shafts 1.2, which is connected to the crank A. The angle position sensor 50, of the rotary variable differential transformer (RVDT) type, is mounted on the outlet shaft of the second line of shafts 1.2.

Elements identical or analogous to those described above are given identical numerical references in the description below of second and third embodiments of the invention.

In the embodiments of FIGS. 3 to 6, the transmission 1 is shown in simplified manner, in particular concerning its gear trains.

As above, the actuator comprises a casing 4 containing all of the components of the actuator. The actuator includes a secondary casing forming a strength member 40 that receives the first line of shafts 1.1, i.e. the motor 2, the torque limiter 7, the damper 11, the pawl device 18, the declutching member 19, and the ratchet wheel 21, and that is fastened via a hinge in the casing 4. The arrangement of these elements is substantially the same as in the first embodiment.

The second line of shafts 1.2 and the clutch 12 are mounted in the casing 4 outside the strength member 40.

Downstream from the pawl device and the torque limiter 7, the outlet from the first line of shafts 1.1 is connected to a member for transforming rotary movement into movement in translation of a slide 22. In this example, the slide 22 is a threaded rod fitted in a nut secured to the outlet of the torque limiter 7. The slide 22 is connected by a connecting rod 23 to an eccentric portion 24 constrained to rotate with a shaft of the second line of shafts 1.2 and thus with the aileron/elevon/spoiler.

The outlet shaft 20 of the electric motor 2 is parallel to a pivot axis of the aileron/elevon/spoiler, and the connecting rod 23 extends in a direction substantially perpendicular to the pivot axis of the aileron/elevon/spoiler.

Figure 3:
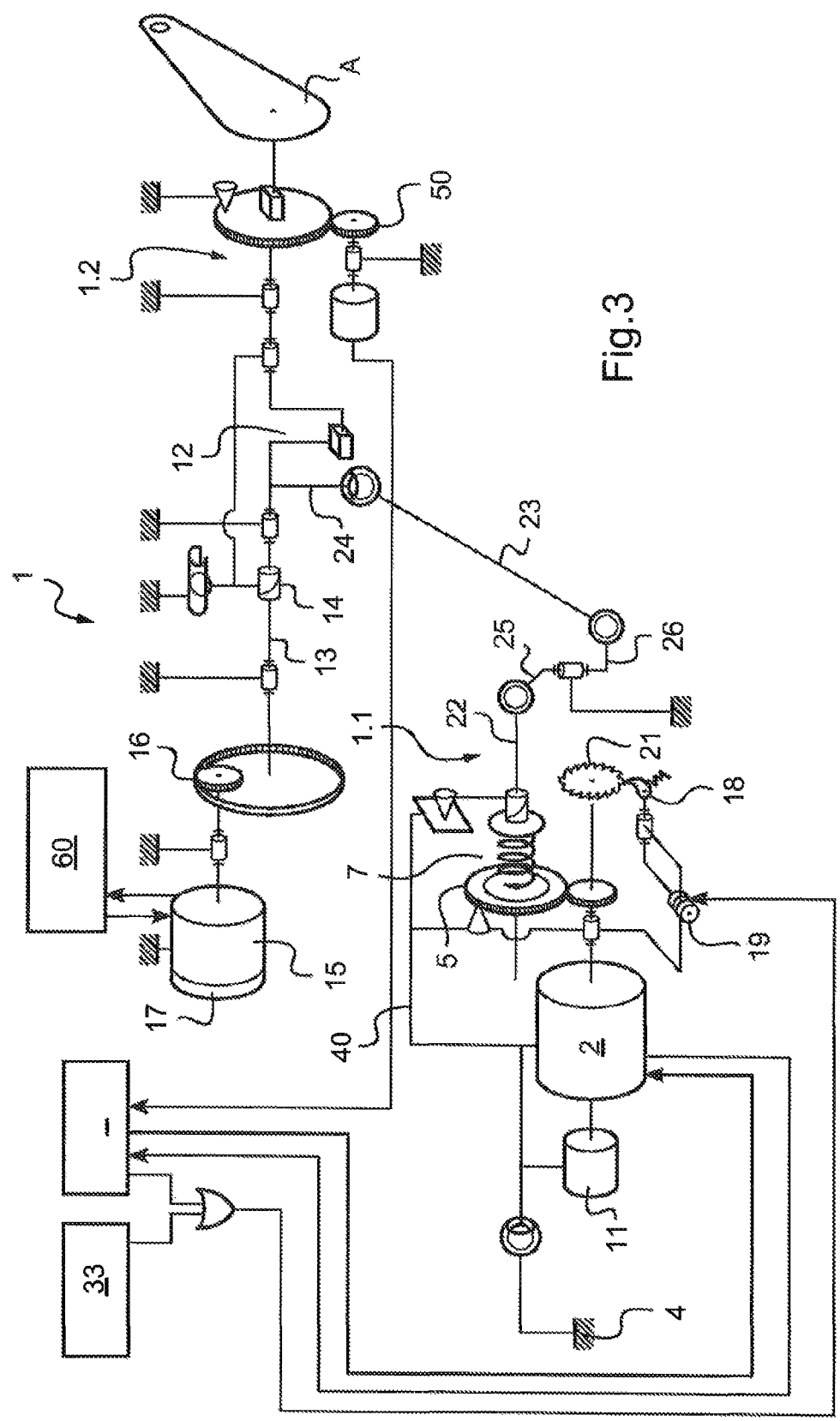
FIG. 3 is a kinematic diagram of an actuator in a second embodiment.
Figure 4:
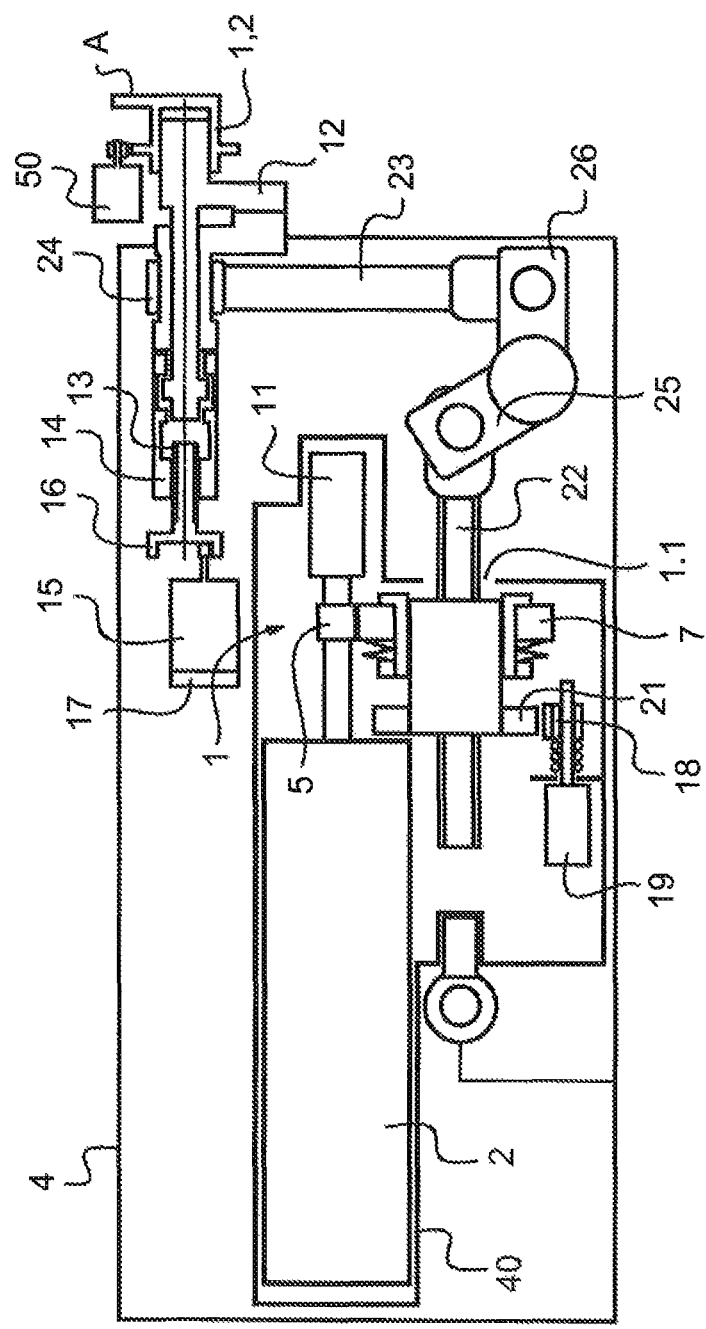
FIG. 4a and FIG. 4b are respectively a longitudinal section view and a cross section view of the FIG. 3 actuator.

With reference to FIGS. 3 and 4, and in accordance with the second embodiment, the slide 22 is hinged to a crank lever 25 for turning an eccentric crank pin 26 to which the connecting rod 23 is connected.

It can be understood that movement in translation of the slide 22 causes the crank and crank pin assembly 25 and 26 to pivot, thereby moving the connecting rod 23 in translation so as to push or pull the eccentric portion 24 and cause the outlet shaft of the second line of shafts 1.2 of the transmission 1 to pivot.

Figure 5:
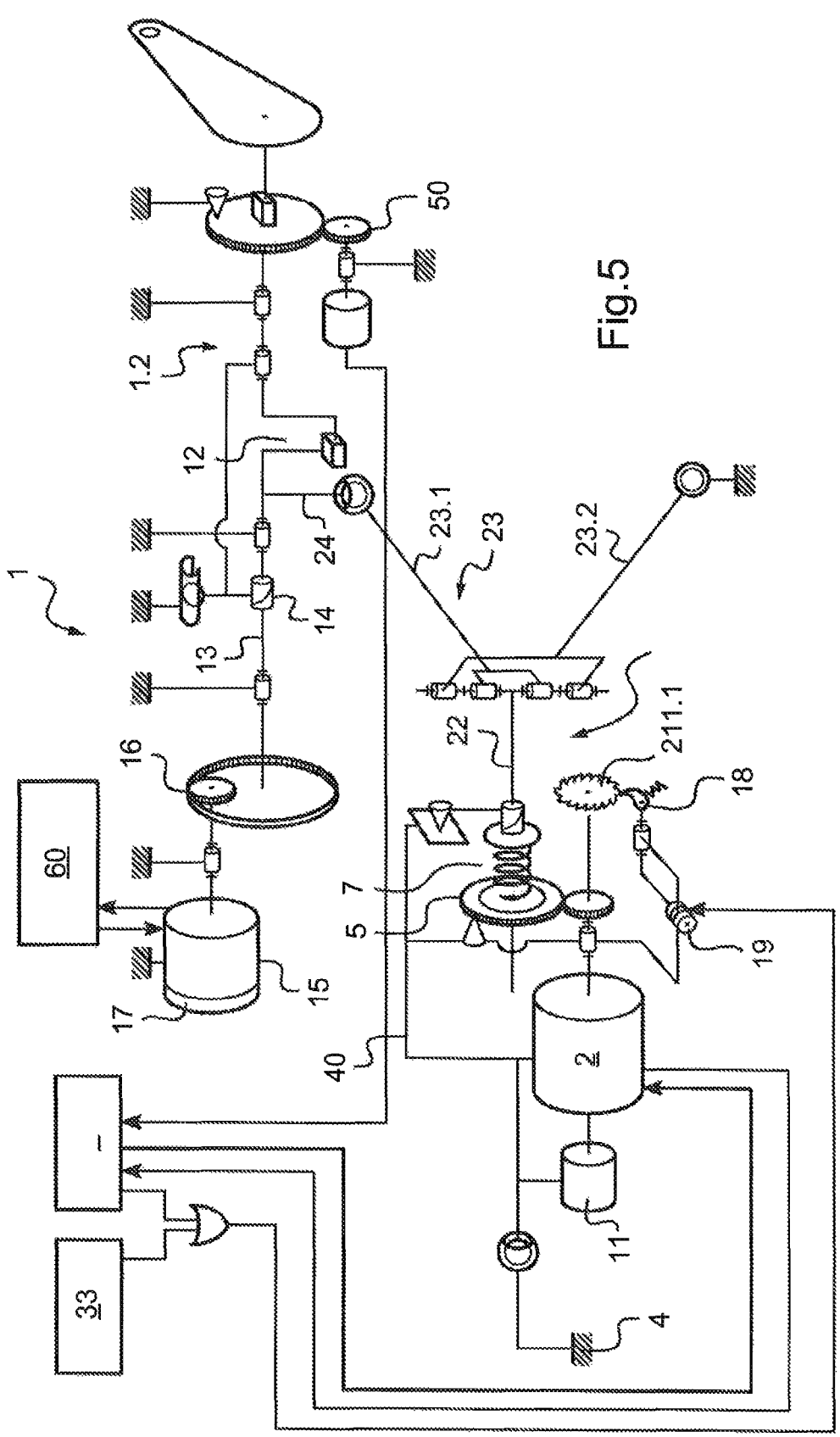
FIG. 5 is a kinematic diagram of an actuator in a third embodiment.

With reference to FIGS. 5 and 6, and in accordance with the third embodiment, the connecting rod 23 comprises a first segment 23.1 hinged to the eccentric portion 24 and to the slide 22, and a second segment 23.2 hinged to the casing 4 and to the slide 22.

It can be understood that moving the slide 22 in translation changes the angle between the connecting rod segments 23.1 and 23.2, and thus changes the spacing between the end of the segment 23.1 connected to the eccentric portion 24 and the end of the segment 23.2 connected to the casing 4. The end of the segment 23.1 connected to the eccentric portion 24 moves the eccentric portion 24 and causes the outlet shaft of the second line of shafts 1.2 of the transmission 1 to pivot.

Naturally, the invention is not limited to the embodiments described, but covers any variant coming within the ambit of the invention as defined by the claims.

In particular, the transmission may be of a structure different from that described. The positions of the clutch, of the torque limiter, of the pawl device, and of the gear trains may be modified. The transmission and the lines of shafts may comprise segments that are coaxial or parallel. The lines of shafts may be parallel or they may be inclined relative to each other.

It is possible to provide a pawl device for each direction of rotation.

In the second and third embodiments, the hinge between the strength member 40 and the casing 4 via a ball joint connection is optional, it being possible for such a connection to be incorporated in the first line of shafts.

It is also possible to avoid incorporating the actuator in a casing, or to incorporate only a portion of the actuator in a casing. The casing 4 may be replaced by a support structure.

The damper 11 may be mounted between the front end of the outlet shaft and the strength member 40.

The invention claimed is:

1. An electromechanical actuator for a movable flight control surface of an aircraft, the actuator comprising an electric motor having an outlet shaft with first and second directions of rotation, a movement transmission arranged to connect the outlet shaft of the motor to the movable flight control surface, and a control unit for controlling the motor, wherein the transmission incorporates a pawl device arranged to oppose the transmission of movement in the first direction of rotation, in that the control unit is connected to a pawl declutching member for declutching the pawl and enabling movement to be transmitted in the first direction of rotation, in that the transmission includes, downstream from the pawl device, a member for transforming rotary movement into movement in translation of a slide connected by a connecting rod to an eccentric portion constrained to move in rotation with the movable flight control surface, and wherein the motor, an adjacent portion of the transmission as far as the slide, the pawl device, and the declutching member are mounted on a strength member connected to a stationary structure by a hinge.

2. The actuator according to claim 1, wherein the outlet shaft of the electric motor is parallel to a pivot axis of the movable flight control surface, and the connecting rod extends in a direction that is substantially perpendicular to the pivot axis of the movable flight control surface.

3. The actuator according to claim 1, wherein the slide is connected to a crank lever for pivoting an eccentric crank pin to which the connecting rod is connected.

4. The actuator according to claim 1, wherein the connecting rod comprises a first segment hinged to the movable flight control surface and to the slide, and a second segment hinged to the stationary structure and to the slide.

5. The actuator according to claim 1, wherein the declutching member is deactivated in the event of a power supply failure to the control unit.

6. The actuator according to claim 1, received in full or in part in a casing provided with means for mounting it on an aircraft structure.

7. An aircraft having wings, each provided with at least one movable airfoil surface of the aileron/elevon/spoiler type associated with at least one actuator according to claim 1, the actuator being mounted so that the pawl opposes a deflection movement of the airfoil surface.

\* \* \* \* \*